June 9, 1959   S. C. BUTLER   2,889,828
INHALATOR GAUGE DEVICE
Filed May 14, 1956
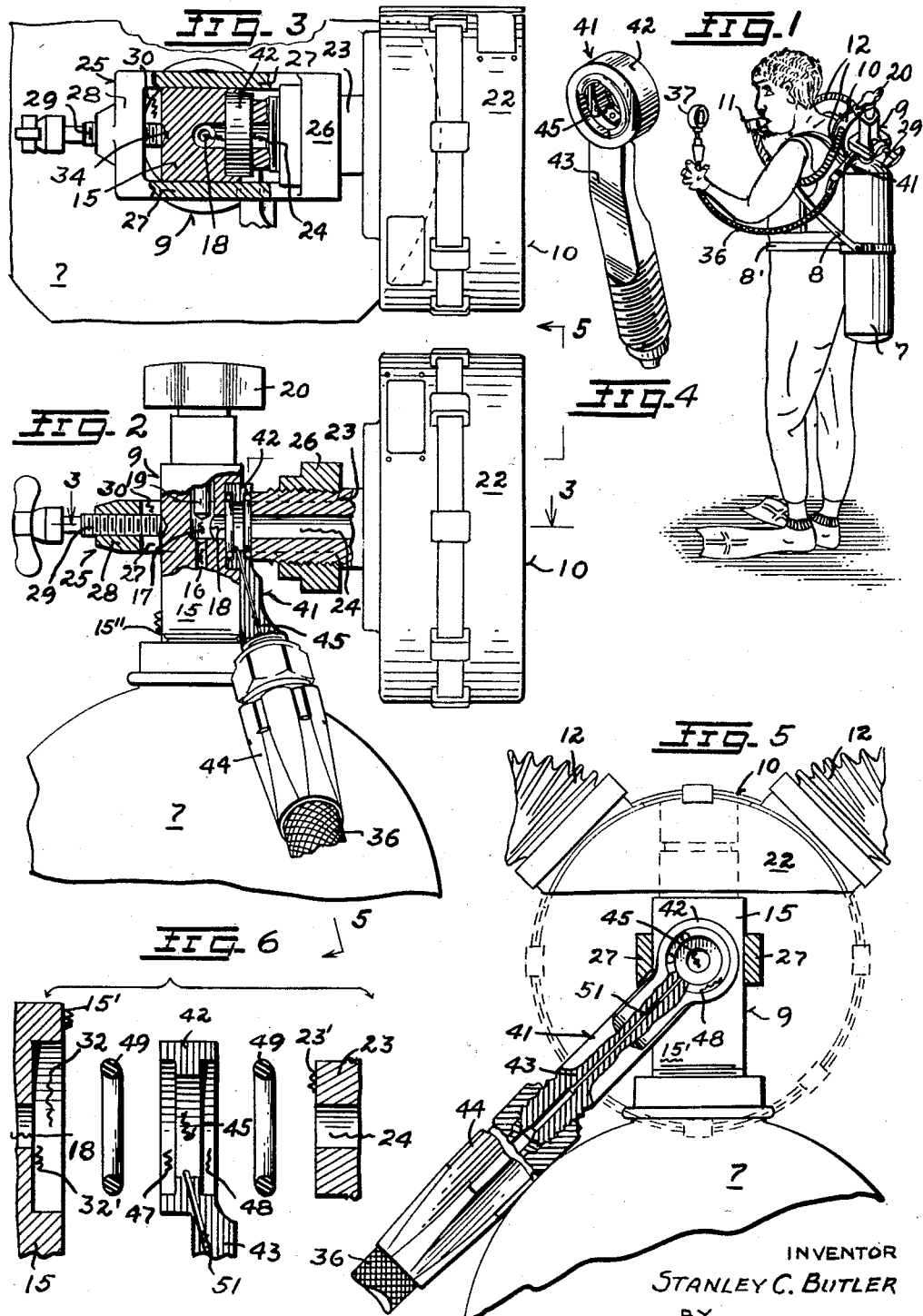
INVENTOR
STANLEY C. BUTLER
BY Henry N. Young
ATTORNEY

United States Patent Office 2,889,828
Patented June 9, 1959

2,889,828
INHALATOR GAUGE DEVICE
Stanley C. Butler, San Lorenzo, Calif.
Application May 14, 1956, Serial No. 584,652
5 Claims. (Cl. 128—142)

The invention particularly relates to a body-carried air-supplying unit, or inhalator, which is particularly designed for underwater use.

In the underwater use of an air-supplying inhalation unit, the user may stay under water only as long as the air tank of the unit contains enough air under pressure to supply the current and prospective breathing needs of the user. Understanding that the failure of the air supply while the user is under water at a considerable distance from an emergence point may have serious results, the present invention provides the user with a means to at any time ascertain the air content of the supply tank in terms of the tank pressure for timing the further use of the apparatus with confidence, and without the necessity of having a reserve air supply available, whereby to accomplish major objects of the present invention.

Another object of the invention is to provide a present type of air-supplying apparatus with a constantly-indicating air-pressure gauge which need be positioned in the normal field of vision of a person carrying the apparatus only when a reading is to be taken.

A further object is to provide for attaching the gauge to usual present arrangements of air-supplying apparatus without requiring structural modifications thereof.

An added object is to provide a particularly simple and effective high-pressure sealed connection for the gauge.

A still further object is to provide a flexible hose connection to the gauge such that the attached gauge may be disposed out of the way when not being referred to.

Yet another object is to provide a pressure gauge attachment for use with gas inhalation units generally.

The invention possesses other objects and features of advantage, some of which, with the foregoing, will be set forth or be apparent in the following description of typical embodiments thereof, and in the accompanying drawings, in which, Figure 1 shows generally a pressure gauge means of my invention as cooperatively associated as an attachment to a skin-diver's underwater breathing apparatus.

Figure 2 is an enlarged side elevation of the apparatus of Figure 1, with a portion thereof at and adjacent the connection for a pressure hose to the gauge shown in section in the plane of the supply valve of the apparatus.

Figure 3 is a partly sectional view taken at and above the line 3—3 in Figure 2.

Figure 4 is an enlarged perspective view of the connection for the gauge hose to the air-supplying apparatus.

Figure 5 is a partly sectional view taken on the broken line 5—5 in Figure 2.

Figure 6 is an enlarged sectional and fragmentary showing of the elements at and adjacent the gauge connection point in Figure 2, the elements being axially separated The present device is particularly disclosed as designed for use with a unitary apparatus which provides for the underwater breathing of air from a tank (or bottle) 7 of compressed natural or oxygenated air; as is usual, the tank 7 is provided with a suitable arrangement of harness straps 8 for mounting it at the back of the body of a user and has a dispensing valve 9 mounted on its head end for providing an adjustably controlled supplying of air to an inhaler or lung unit 10 carried thereby and from which the air is delivered to and from the user's mouth during its breathing at an applied mouthpiece 11. As particularly illustrated, the mouthpiece 11 is connected to the unit 10 by a pair of flexible hoses 12, one said hose being arranged to deliver fresh air at the mouthpiece 11 while the other returns the used air to the unit 10 for an appropriate carbon-dioxide-removing treatment therein or for its release behind the user of the apparatus, the arrangement and assembly being a usual one in apparatus providing for the breathing of submerged persons, and being then commonly referred to as a "self-contained under-water breathing apparatus."

By more specific reference to the unitary tank and inhaler assembly to which the features of my invention are applied, it will be noted that the air-discharge valve 9 for the tank 7 comprises an elongated body block 15 of rectangular cross section having one end threadedly engaged in the head end of the tank 7, and providing a duct 16 extending longitudinally in its tank-engaging portion from the tank space to an interior cavity 17 from which a duct 18 extends laterally to a flat side 15' of the body. A valve plug provided by a stem 19 is operative in the body 15 as a needle valve against an opposed complementary valve seat provided at the juncture of a duct 16 with the cavity 17, and the valve stem 19 is threadedly and sealedly engaged through the end of the body block 15 opposite the duct 16, whereby the valve assembly thus provided may be closed or opened as desired by appropriately rotating the stem 19 by the use of a handle knob 20 provided on the extending stem end.

It will now be noted that the rigid and generally cylindrical body 22 of the present lung unit 10 is provided with a tubular extension 23 which provides a longitudinal duct 24 arranged for its sealed connection with the duct 18 of the valve body 15 to which the extension 23 is removably and rigidly attached for a support of the unit 10 from the body-mounted tank 7. In the present assembly, a yoke member 25 is provided for connecting the extension 22 to the block 15 with the ducts 18 and 24 sealedly connected, and has a tubular end portion 26 threadedly receiving the complementarily threaded lung extension 23 in its bore. Spaced parallel sides 27 of the member 25 receive the valve block 15 between them in sliding engagement with opposite sides of the block, a head bar 28 connects the sides 27 at the opposite ends of the block-receiving space from the part 26, and a clamp screw 29 threadedly engaged through the bar 27 is operative against the opposed face 15" of the valve block 15 disposed in the yoke opening 30 for drawing the extending end of the extension 22 against the block 15 with the required degree of pressure to provide a rigid "aqualung" assembly of the tank 7 and the lung unit 10.

For providing a normal and usual seal of the extension 23 with the valve body 15, said valve body is provided with an annular counterbore 32 extending into it from its face 15' and coaxially about the duct 18 and arranged to coaxially receive a suitable sealing ring in engagement with its inner end 32' against which the outer end face 23' of the extension 23 of the unit 10 is normally arranged to be forcibly seated to seal the juncture provided between the extension and the block by reason of the operative disposal of the yoke member 25 and a tightening of its clamp screw 29 against the valve block 15 to simultaneously mount the unit 10 on the valve body. To insure a proper positioning of the yoke carried on the unit 10 with respect to the valve block 15, said block is preferably provided with a socket 34 in its flat side 15" for complementarily receiving the more-or-less pointed end of the clamp screw 29 when the extension duct 24 is aligned with the block duct 18.

Understanding that a skin diver's body-carried air-supplying assembly of the type described is not normally provided with a means for use by the wearer of the unit to ascertain the air supply available in the bottle or tank 7 while submerged, the present device of interest comprises a provision for the attached association with such a unit of a constantly operating indicating gauge which may be readily viewed, when desired, by the wearer of the apparatus, and yet may be disposed and carried in an out-of-the-way position on the wearer's body when not being referred to. More specifically, the device of interest comprises, in its present form, the interposition in the passage from the unit 10 to the air supply valve 9 of a connection for a flexible hose 36 extending to a suitable indicating gauge 37 which is arranged for its disposal for a viewing of its indications at convenient times by the wearer of the air-supplying unit; the calibrations of the gauge 37 may indicate the pressure and/or remaining quantity of air in the supply tank 7, and the gauge is of any suitable structure adapted to endure the maximum pressure which may be provided from the tank 7.

As shown, the connection of the passage of the hose 26 to the gauge 37 is provided by a one-piece connector member 41 which has a tubular head portion 42 having mutually parallel ends and provided at one end of a stem portion 43 extending radially from it and externally threaded at its other end for effecting its sealed connection with the hose 36 by means of a usual coupling connection 44. The axial passage 45 of the head portion 42 of the member 41 is arranged to connect the duct 24 of the extension 23 with the duct 18 of the valve body 15 when the head 42 is sealedly interposed between said ducts. For sealedly fixing the head 42 between the inhaler unit 10 and the supply valve 9, the ends of the head 42 are provided with inwardly counter-bored seats 47 and 48 at the extremities of the head passage 45 whereby to provide for the retained and sealingly compressed engagement of suitable sealing rings 49 of rubber or neoprene, etc., between the head 42 and the opposed end face 23' of the extension 23 and the block face 32', by the action of the clamp means of the yoke 25 and its screw 29; in practice, the sealing rings or gaskets 49 may, for instance, comprise O-rings of rubber or neoprene, as illustrated.

A duct 51 extends longitudinally through the stem portion of the member 41 for connecting the bore 45 of the member head 42 with the passage of the hose 36 connected to the other stem end, and said duct is preferably relatively small to prevent instantaneous and possibly damaging pressure surge effects at the gauge 37, it being understood that the larger duct of the hose is operative to further minimize such effects. The use of the yoke member 25 as the means for securing the member 41 in its operatively installed position provides a particularly rigid means for installing or removing or replacing the member 41 in sealed relation to the tank and inhaler assembly 7—10, and is of such length that the gauge may be held by a hand for viewing by the diver at any time, yet the gauge may be conveniently carried in an out-of-the-way location on the body by attaching it to the supporting harness, usually at a belt strap 8' thereof.

By the provision and use of a present gauge attachment, comprising the gauge 37 and hose 36 and connecting member 41, with a skin diver's inhalation unit, the submerged diver may constantly be advised as to the air supply available to him in planning his underwater activities and so markedly increase his factor of safety during the use of the inhalation unit in underwater industrial or sport activities while obviating the need for a common safety practice of providing a reserve supply of air with the unit. Another outstanding advantage of the present arrangement is the fact that the disclosed indicating gauge and hose combination is adaptable for its ready application as an attachment to present inhalant-providing assemblies of various makes, whether the same are to be used in or out of the water, this particularly by reason of the provision for the gauge-attaching use of the releasable connection between the usual inhaler and the supply tank. It will also be understood that the provision of the indicating gauge and hose combination for providing indications within the field of vision of the user of an inhalation unit in accordance with the residual pressure in its supply tank is a particularly valuable adjunct to the self-administration of a gas for breathing, whether in or out of water, and whether the inhalant gas comprises atmospheric air or oxygen or oxygen-reinforced air or an anesthetic gas or some other gas.

From the foregoing description, taken in connection with the accompanying drawings, the advantage of the present inhaler gauge device will be readily understood by those skilled in the art to which the invention appertains. While I have shown and described an arrangement which I now consider to be a preferred embodiment of my invention, I desire to have it understood that the showings are primarily illustrative, and that such changes and developments may be made, when desired, as fall within the scope of the following claims.

I claim:

1. In combination with an inhaler and an inhalant supply tank and a sealed pipe connection between the inhaler and tank, a separable sealed joint in said pipe for providing a rigid connection therein, releasable means directly reactive between the inhaler and tank to provide said connection, a pressure-operative indicating gauge, a hose providing a flexible duct to said gauge and extending from a connector head arranged for interposition in said pipe connection, and means utilizing said releasable connecting means to fixedly and sealedly secure the said head in the connection whereby the tank pressure head may constantly provide the gauge indication.

2. In combination with an inhaler and an inhalant supply tank and a pipe connection between the inhaler and tank, a separable sealed joint in said pipe providing a rigid sealed connection therein, a releasable clamp means directly reactive between the inhaler and tank to provide said sealed connection, a pressure-controlled indicating gauge, a connector head arranged for its sealed interposition in said pipe connection, a hose providing a flexible duct to said gauge and extending from said connector head, and means utilizing said releasable clamp means to fixedly and sealedly secure the said head interposed in the connection whereby the tank pressure constantly provides the gauge indication.

3. In combination with an inhaler and an inhalant supply tank and a pipe connection between the inhaler and tank including a separable sealed joint secured by an adjustable clamp means, a pressure-gauging unit comprising a pressure-actuated gauge connected to a hose providing a duct to said gauge from a connector head arranged for its sealed interposed connection in said pipe joint by the action of said clamp means.

4. In combination with an inhaler and an inhalant supply tank and a pipe means providing a duct connecting the inhaler to the tank for supplying inhalant to the inhaler at tank pressure and including an axially separable connection for the pipe secured by an adjustable clamp means, a pressure-actuated indicating gauge connected to a hose providing a duct to said gauge from a connector head arranged for its sealed interposition in the pipe connection to provide a duct portion for the pipe, said clamp means being alternatively operative to sealedly close the pipe connection whether or not the connector head is interposed in the pipe connection.

5. The structure of claim 4 in which the opposed portions of the pipe at the pipe connection are axially separable, and the connector head for the gauge hose is complementarily engageable with and between the said opposed pipe portions of the pipe connection.

References Cited in the file of this patent

FOREIGN PATENTS

| | | |
|---|---|---|
| 234,304 | Switzerland | Jan. 16, 1945 |
| 976,590 | France | Nov. 1, 1950 |